Patented May 19, 1942

2,283,747

UNITED STATES PATENT OFFICE 2,283,747

VULCANIZATION OF RUBBER

Roger A. Mathes, Akron, Ohio, assignor to The B. F. Goodrich Company, New York, N. Y., a corporation of New York No Drawing. Application November 16, 1939, Serial No. 304,784

12 Claims. (Cl. 260—784)

This invention relates to the vulcanization of rubber and has for its primary object the provision of a new class of vulcanization accelerators.

Broadly, the invention comprises vulcanizing rubber compositions with a mercapto oxazoline, or a derivative thereof, as represented by the following structural formula

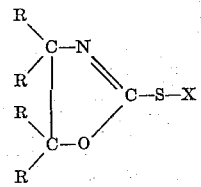

where each R represents a hydrogen atom or a hydrocarbon group such as an alkyl, aryl or aralkyl group or a substituted hydrocarbon group. R in addition may represent halogen; alkoxy, hydroxy, hydroxyalkyl, amino groups, etc.

Where the free mercapto compound is employed, X represents a hydrogen atom. In the case of a derivative X represents those groups which are known not to destroy the ability of mercapto compounds to accelerate vulcanization, including principally salt forming groups, ester forming groups, acidyl groups and polysulfide forming groups. More specifically, the salt-forming group may be metal as sodium, calcium, barium, magnesium, zinc, lead, cadmium, etc. In addition, the salt-forming group may be derived from an amine or other nitrogenous base, and therefore includes the ammonium and substituted ammonium groups. The ester forming group may be acyclic, carbocyclic, heterocyclic, etc., either unsubstituted or substituted groups; preferably those recognized as being of a negative character, such as triphenyl methyl or dinitrophenyl groups, or aminated hydrocarbon groups such as those contained in the reaction products of the mercapto compounds with an amine or other nitrogenous base and aldehyde such as formaldehyde. The acidyl groups include not only simple acyl groups such as acetyl and benzoyl but substituted acyl groups such as nitrobenzoyl and anilinobenzoyl and particularly those derived from the same or different thio acids such as oxazolinyl, thiazolinyl, thiazyl, benzothiazyl, thiocarbamyl, thiocarbonyl and like groups capable of forming with mercapto-oxazolines the corresponding acid anhydrides or "monosulfides." The polysulfide forming groups include especially the —S—X and —(S)$_x$—X groups where X is an oxazolinyl group identical with that in the remainder of the compound, and the

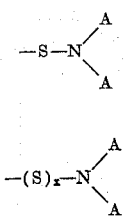

and $$-(S)_x-N\begin{matrix}A\\A\end{matrix}$$

groups where each A represents a hydrocarbon group.

As specific derivatives belonging to these general classes may be mentioned mono, di and poly sulfides; reaction products with aldehydes such as formaldehyde; reaction products with acyl halides as benzoyl chloride; nitro aryl esters; reaction products with nitro aryl sulfur halides; amine salts; quaternary ammonium salts; mixed monosulfides, formed by reaction with 2-halo thiazoles; reaction products with formaldehyde and an amine such as ethylene diamine or aniline; guanidine salts; reaction products with chloroamines; amino-ethyl esters (primary, secondary or tertiary); reaction products with carbonyl chloride and thiocarbonyl chloride; etc.

As examples of mercapto-oxazolines which may be employed, are 2-mercapto-oxazoline; 2-mercapto 4-hydroxy methyl oxazoline; 2-mercapto 5-methyl 5-hydroxy methyl oxazoline; 2-mecapto 5-phenyl oxazoline; 2-mercapto 5-tolyl oxazoline; 2-mercapto 5-butyl oxazoline; 2-mercapto 4-amyl 5-ethyl oxazoline; 2-mercapto 4-ethyl 5-phenyl oxazoline; 2-mercapto 5,5-dimethyl-oxazoline; etc., may be employed either as the free mercapto compounds or in the form of any of the derivatives mentioned herein.

I have discovered that the mercapto-oxazolines and derivatives thereof, as for example 2-mercapto 5,5- dimethyl oxazoline, are active accelerators for the vulcanization of rubber. Such compounds comprise a new class of rubber vulcanization accelerators, the derivative being in most cases new compositions of matter. Their superiority over the mercapto-oxazoles, as mercaptobenzoxazole and mercaptonaphthoxazole is quite unexpected. The mercapto-oxazoles are such feeble accelerators that they are of no practical value. Their activity is increased somewhat by amine activation. The mercapto-oxazolines, on the other hand, are active accelerators of vulcanization when used as the free mercapto compounds. They also respond to amine activation. Best results are obtained when the mercapto-oxazolines are used in the presence of an acid, as for example lauric acid.

The following examples illustrating the preparation of mercapto-oxazolines and certain derivatives, together with data showing their value in vulcanized rubber mixes are intended to be in no way restrictive. Many additional derivatives may be prepared and compounded with rubber in various ways to give similar results.

In the vulcanization tests, a base recipe was used comprising by weight

| | Parts |
|---|---|
| Rubber | 100 |
| Zinc oxide | 5 |
| Sulfur | 3.5 |
| Lauric acid | 3 |
| Accelerator | 1 |

EXAMPLE 1.—*2-mercapto 5,5-dimethyloxazoline*

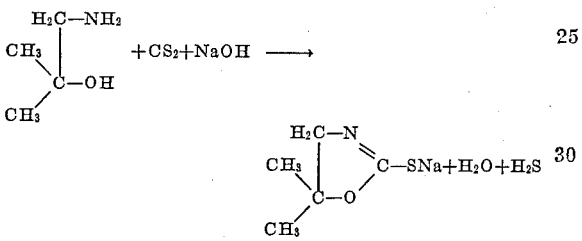

To a solution consisting of 1 liter of alcohol, 200 cc. of water and 160 g. of sodium hydroxide were added 178 g. of 1-amino 2-hydroxy isobutane and 304 g. of carbon disulfide. The solution was heated under reflux for several hours until the evolution of hydrogen sulfide had ceased. The solution was evaporated to removed alcohol, diluted with water and acidified, whereupon white crystals of 2-mercapto 5,5-dimethyloxazoline precipitated. 192.5 g. of product, melting at 103°–6° C. were obtained.

One part by weight of this compound was incorporated in the base recipe and the stock when vulcanized gave the following results:

| Time in minutes | Tensile strength (lbs. per sq. in.) | Percent elongation |
|---|---|---|
| 15 min. at 287° F | 2,240 | 975 |
| 30 min. at 287° F | 2,730 | 865 |
| 60 min. at 287° F | 3,080 | 800 |

EXAMPLE 2.—*(2-amino ethyl) 5,5-dimethyloxazylsulfide*

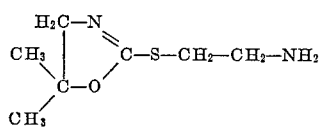

A solution consisting of 26.2 g. 2-mercapto 5,5-dimethyl oxazoline, 23.2 g. of 2-chloroethylamine hydrochloride and 17.6 g. of sodium hydroxide in 150 cc. of water, was refluxed for two hours. The solution was evaporated to a small volume whereupon sodium chloride and a straw-colored oil came down. The oil was separated off and dried. The weight was 31.5 g.

One part by weight of this compound was incorporated in the base recipe and the stock when vulcanized gave the following results:

| Time in minutes | Tensile strength (lbs. per sq. in.) | Percent elongation |
|---|---|---|
| 15 min. at 287° F | 1,910 | 890 |
| 30 min. at 287° F | 3,670 | 820 |
| 60 min. at 287° F | 3,520 | 795 |

EXAMPLE 3.—*Diphenyl guanidine salt of 2-mercapto 5,5-dimethyloxazoline*

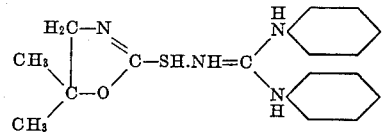

An alcohol solution of 13.1 g. of 2-mercapto 5,5-dimethyl oxazoline was added to 21.1 g. of diphenylguanidine also dissolved in alcohol. When the alcohol was removed by evaporation, a white, compact cake was obtained, weighing 33 g. This product melted at 84°–86° C.

One part by weight of this compound was incorporated in the base recipe and the stock when vulcanized gave the following results:

| Time in minutes | Tensile strength (lbs. per sq. in.) | Per cent elongation |
|---|---|---|
| 15 min. at 287° F | 3,140 | 885 |
| 30 min. at 287° F | 3,720 | 800 |
| 60 min. at 287° F | 4,080 | 820 |

EXAMPLE 4.—*Zinc salt of 2-mercapto 5,5-dimethyloxazoline*

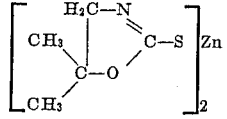

To a solution of 39.3 g. of 2-mercapto 5,5-dimethyl oxazoline in 13.2 g. of sodium hydroxide and 50 cc. of water was added 22.4 g. of zinc chloride as a 20% water solution. The thick precipitate which formed was diluted further with water and filtered. 42 g. of a white powder were obtained One part by weight of this compound was incorporated in the base recipe and the stock when vulcanized gave the following results:

| Time in minutes | Tensile strength (lbs. per sq. in.) | Per cent elongation |
|---|---|---|
| 15 min. at 287° F | 1,190 | 1,000 |
| 30 min. at 287° F | 2,320 | 940 |
| 60 min. at 287° F | 2,680 | 900 |

It will be evident that accelerators described in my invention are applicable to rubber products of a varied nature, their use being in no way restricted to rubber compositions given as examples. Rubber goods of such a nature as pneumatic and solid tires, tubes, boots and shoes, surgical rubber goods, mechanical rubber goods such as hose, belting, packing, etc. may be vulcanized in the presence of accelerators herein disclosed.

The accelerator may be incorporated into the rubber by mastication, milling, etc., or in the case of latex, rubber cement or other natural or artificial dispersion or solution of rubber, by dissolving or suspending the accelerator therein.

The term "a rubber" is to be construed broadly to designate rubbery materials capable of vulcanization with sulfur, such as caoutchouc, reclaimed rubber, gutta percha, balata, latex, synthetic rubber or rubber isomers whether or not admixed with pigments, fillers, softeners, antioxidants, other accelerators, etc.

The methods of using the various accelerators described, as to quantity employed, time of vulcanization, heat required, and the proportions of compounding ingredients such as sulfur, metal oxide, etc., may be varied without departing from the principle of the invention. The accelerators described may also be used in conjunction with other accelerators such as mercaptothiazoles, thiuramdisulfides, dithiocarbamic acid derivatives, dithiazyl disulfides, etc.

I claim:

1. A process which comprises vulcanizing a rubber in the presence of a compound selected from the class consisting of 2-mercapto-oxazolines having no substituents on the ring other than hydrocarbon groups, and salts thereof.

2. A process which comprises vulcanizing a rubber in the presence of a 2-mercapto-oxazoline having no substituents on the ring other than hydrocarbon groups.

3. A process which comprises vulcanizing a rubber in the presence of a salt of a 2-mercapto-oxazoline having no substituents on the ring other than hydrocarbon groups.

4. A process which comprises vulcanizing a rubber in the presence of an alkyl substituted 2-mercapto-oxazoline.

5. A process which comprises vulcanizing a rubber in the presence of 2-mercapto 5,5-dimethyloxazoline.

6. A process which comprises vulcanizing a rubber in the presence of the zinc salt of 2-mercapto 5,5-dimethyloxazoline.

7. A composition comprising a rubber which has been vulcanized in the presence of a compound selected from the class consisting of 2-mercapto-oxazolines having no substituents on the ring other than hydrocarbon groups, and salts thereof.

8. A composition comprising a rubber which has been vulcanized in the presence of 2-mercapto-oxazoline having no substituents on the ring other than hydrocarbon groups.

9. A composition comprising a rubber which has been vulcanized in the presence of a salt of a 2-mercapto-oxazoline having no substituents on the ring other than hydrocarbon groups.

10. A composition comprising a rubber which has been vulcanized in the presence of an alkyl substituted 2-mercapto-oxazoline.

11. A composition comprising a rubber which has been vulcanized in the presence of 2-mercapto 5,5-dimethyloxazoline.

12. A composition comprising a rubber which has been vulcanized in the presence of the zinc salt of 2-mercapto 5,5-dimethyl oxazoline.

ROGER A. MATHES.